Feb. 17, 1925.

C. S. PRESTON 1,526,503

SEMISOLID TIRE

Filed Nov. 5, 1923

Inventor

Clarence S. Preston,

By Edson Bros.

Attorneys

Patented Feb. 17, 1925.

1,526,503

UNITED STATES PATENT OFFICE.

CLARENCE S. PRESTON, OF SAN DIEGO, CALIFORNIA.

SEMISOLID TIRE.

Application filed November 5, 1923. Serial No. 673,008.

*To all whom it may concern:*

Be it known that I, CLARENCE S. PRESTON, a citizen of the United States, residing at San Diego, in the county of San Diego and State of California, have invented certain new and useful Improvements in Semisolid Tires, of which the following is a specification.

This invention relates to automobiles or other vehicles, and more particularly to tires therefor.

An object of the present invention is to provide a tire for automobiles or other vehicles which shall possess the advantage of being puncture proof.

Another object of the invention is to provide a tire for vehicles which will not be subject to the disadvantages attendant upon its being punctured and which will at the same time possess the riding qualities usually associated with a pneumatic tire.

A further object of the invention is to provide a tire for automobile wheels which shall have improved suspension means.

A still further object of the invention is to provide such a tire that is vulcanized to the rim of the vehicle wheel.

Other objects and advantages of the invention will appear from the following description taken in connection with the accompanying drawings, which illustrate a preferred embodiment of the invention, and in which—

Figure 1:
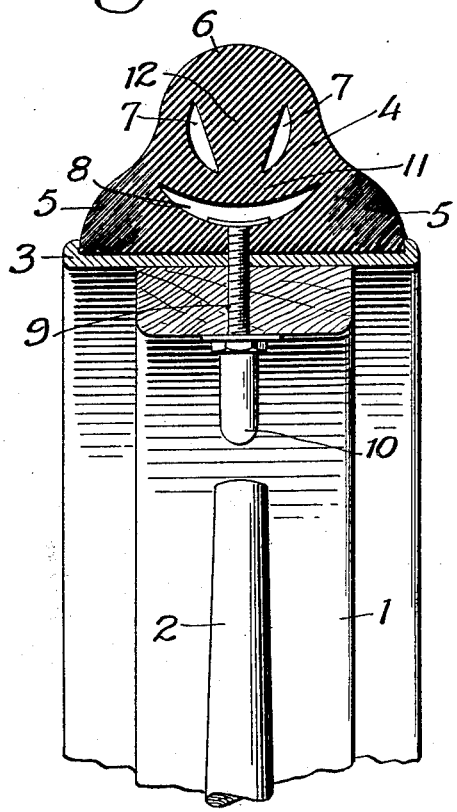
Figure 1 is a sectional view through an automobile wheel and tire embodying the present invention.

Referring in detail to the drawings, and especially to Fig. 1, the wheel 1 is provided with spokes 2 of any convenient or usual type, either of wood or wire, disk or other type, and the rim 3. The wheel 1 is also provided with any convenient usual or standard form of hub, not shown, as it forms no part of the present invention.

To the rim 3 may be vulcanized the semisolid tire 4, which consists, as shown, of annular side edge portions 5, and the annular tread 6. It will be observed that the tire is very roughly substantially triangular in cross section. Within the tire are provided channels or voids 7 which may, as shown, be two in number and somewhat crescent shaped in cross section. Looked at in cross section, the channels 7 diverge in a radially outward direction. Inwardly of the annular voids 7 is provided near the inner periphery of the tire an annular channel 8 which may, as shown, conveniently be made somewhat crescent shaped in cross section, if desired. The annular channel 8 may be provided with a valve stem 9 having the dust cap 10 which may be removed for the purpose of pumping air through the valve stem 9 into the annular channel 8 until the desired pressure is obtained within said channel.

The foregoing construction leaves what may be termed a bridge 11 between the tread portion and the inner periphery of the tire and which may be regarded as being suspended upon the annular side edges 5 of the tire, pressure being transmited from the tread proper to said bridge through the central solid portion 12 between the voids 7.

The annular side edges 5 may be made of somewhat harder material than the other portions of the tire, thereby increasing the suspension effect and, consequently, improving the resiliency and riding qualities of said tire.

Figure 2:
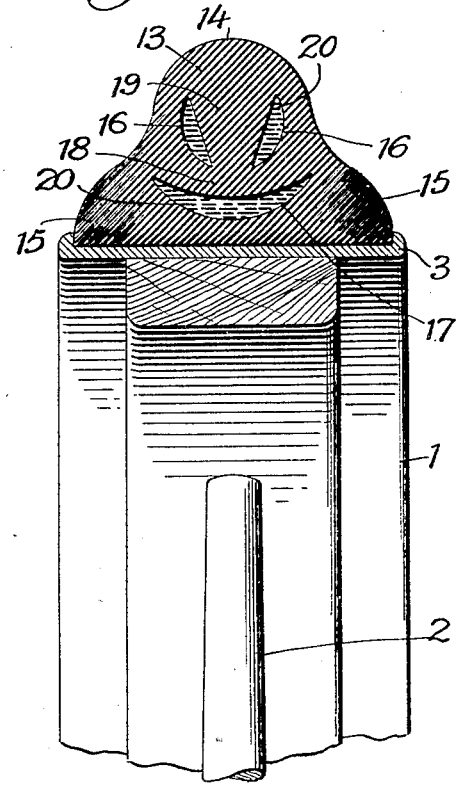
Fig. 2 is a sectional view through an automobile wheel and tire showing a slightly modified form of the invention.

Referring now to Fig. 2 of the drawings, the wheel 1 having spokes 2 and the rim 3 may be of any usual or desired construction. To the rim 3 may be vulcanized, as before, the tire 13, having the tread portion 14 and the inner annular side edges 15. The tire 13 may be vulcanized at its inner periphery to the rim 3, and, as in Fig. 1, the inner annular side edges 15 of the tire may be of relatively harder material than the main body 13 of the tire in order to provide effective load suspension means and increase the resiliency and improve the riding qualities of the tire, and inner voids 16, herein shown as being two in number for convenience, are provided in the tire 13 and may, as shown, be substantially crescent shape in cross section, the two voids 16 diverging outwardly toward the tread portion 14 of the tire. The inner annular channel 17 may also be provided and be substantially crescent shaped in cross section, forming as before the bridge portion 18 by means of which the outer or tread portion of the tire is suspended upon the side 15, the load being tansmitted to said bridge through the solid portion 19 between the voids 16, as well as through the solid portions of the tire on the outside of said void.

The annular voids 16 and channel 17 may be filled with relatively soft yieldable matter such as rubber 20, which tends to absorb shocks and at the same time is sufficiently soft to permit considerable movement of the harder portions of the tire with respect thereto.

It will be seen that by the foregoing construction there has been provided a tire which has its tread portion suitably suspended to improve its riding qualities, which is provided with relatively hard side portions between which a central portion is flexibly suspended, and one which, though substantially solid, is yet provided with soft cushioning means which increase its resilience and improve its riding qualities, the tire being at the same time not subject to the disadvantages usually attendant upon puncturing an ordinary pneumatic tire.

What is claimed is:

1. A semi-solid tire for vehicles comprising an annular resilient body having substantially concave sides and a convex tread, said annular body having therein outwardly diverging annular voids, and an annular channel substantially crescent shaped in cross section adjacent its inner periphery, the inner side edges of said annular body being of harder material than said convex tread to coact with the voids to improve the suspension effect thereof.

2. A semi-solid tire for vehicles, comprising an annular resilient body having a tread portion and outwardly diverging annular voids therein and an annular channel adjacent its inner periphery, relatively soft resilient material in said channel, the sides of said tire converging outwardly, and being of harder material than said tread portion at their inner edges to provide the proper suspension of the load.

3. A semi-solid tire for vehicles comprising an annular resilient body having outwardly converging sides, the inner peripheral edges of said sides being of relatively hard material, said tire body having an annular channel therein adjacent its inner periphery, and having a load sustaining portion of relatively soft material suspended on said relatively hard side edges said hard side edges being adapted to coact with the channel to properly suspend the load.

4. A semi solid tire for vehicles comprising an annular resilient body provided with annular voids arranged to form a load sustaining bridge, the sides adjacent the inner periphery of said tire being formed of harder material than the body of the tire, said hardened portions being adapted to coact with the load sustaining bridge to properly suspend the load.

In testimony whereof I affix my signature.

CLARENCE S. PRESTON.